United States Patent [19]
Smolik et al.

[11] Patent Number: 5,611,938
[45] Date of Patent: Mar. 18, 1997

[54] BIOCIDAL BLENDS OF QUATERNARY AMMONIUM COMPOUNDS AND CHLORINE DIOXIDE

[75] Inventors: Nancy A. Smolik, Staten Island, N.Y.; Linda H. Rusznak, Bayonne; Dale A. Jenson, Long Valley, both of N.J.

[73] Assignee: Ashland Inc., Columbus, Ohio

[21] Appl. No.: 396,135

[22] Filed: Feb. 28, 1995

[51] Int. Cl.$^6$ .................................................. C02F 1/50
[52] U.S. Cl. ........................................... 210/755; 210/764
[58] Field of Search ................................. 210/764, 730, 210/755

[56] References Cited

U.S. PATENT DOCUMENTS

| | | | |
|---|---|---|---|
| 5,320,773 | 6/1994 | Perman et al. | 210/730 |
| 5,324,432 | 6/1994 | Robertson et al. | 210/764 |

*Primary Examiner*—Thomas G. Wyse
*Attorney, Agent, or Firm*—David L. Hedden

[57] ABSTRACT

This invention relates to biocidal blends comprising quaternary ammonium compounds and chlorine dioxide. It also relates to a process of inhibiting the growth of bacteria in aqueous system which comprises adding the biocidal blend to an aqueous system containing bacteria. The use of the biocidal blend results in an unexpected synergism.

6 Claims, No Drawings

BIOCIDAL BLENDS OF QUATERNARY AMMONIUM COMPOUNDS AND CHLORINE DIOXIDE

FIELD OF THE INVENTION

This invention relates to biocidal blends comprising quaternary ammonium compounds and chlorine dioxide. It also relates to a process of inhibiting the growth of bacteria in aqueous system which comprises adding the biocidal blend to an aqueous system containing bacteria. The use of the biocidal blend results in an unexpected synergism.

BACKGROUND OF THE INVENTION

Biocide compositions for controlling the growth of bacteria are known. Such bacteria are found in many aqueous systems, for example natural waters, pools, and industrial systems such as cooling water systems, air washer systems, and pulp and paper mill systems. The presence of such bacteria can cause slime which can foul, plug, or corrode the system.

There a number of compounds which are used as biocides. Among them are isothiazolones such as 2-methyl-4-isothiazolin-3-one; 2,2-dibromo-3-nitrilopropionamide; thiones as 3,5-dimethyl-tetrahydro-2H-1,3,5-thiadiazine-2-thione; chlorine dioxide; dithiocarbamates such as sodium dimethyl dithiocarbamate and disodium ethylene bis-dithiocarbamate; thiocyanates such as methylene bis-thiocyanate; quaternary ammonium chlorides such as alkyl dimethyl benzyl ammonium chloride and dialkyl methyl benzyl ammonium chloride; chlorine; hypochlorite; chlorine dioxide; hydrogen peroxide; peracetic acid; glutaraldehyde; N-4-dihydroxy-alpha-oxobenzene ethanimidoyl chloride; 1-alkyl(C16–18)amino-3aminopropane acetate; bis(trichloromethyl) sulfone; 5-chloro-2-methyl-4-isothiazolin-3-one; 2-(thiocyanomethylthio)benzothiazole; and bis(trichloromethyl) sulfone; 1-(3- chloroallyl)-3,5,7-triazoniaadamatane chloride; N-4-dihydroxy-alphaoxobenzene ethanimidoyl chloride; sodium hypochlorite; 4,5-dichloro-1,2-dithio-3One; decylthioethylamine; and dodecylquandine hydrochloride.

Although numerous biocides like these have been known for many years, it is not possible to predict with any accuracy how they will interact when combined. Consequently, there is an interest in developing new biocide mixtures which provide advantages under use conditions.

SUMMARY OF THE INVENTION

This invention relates to biocidal blends comprising:
A. a quaternary ammonium compound, and
B. chlorine dioxide,
wherein the weight ratio of quaternary ammonium compound to chlorine dioxide is from 1:5 to 1:100, preferably 1:5 to 1:25. This invention also relates to a process for controlling the growth of bacteria in an aqueous system containing bacteria which comprises adding the biocide blends to said aqueous system.

The use of the biocidal blend results in an unexpected synergism. It was found that the same concentration of biocide required to reach the same level of effectiveness is less if a blend of quaternary ammonium compound and chlorine dioxide are used instead of using the same amount of chlorine dioxide and the quaternary ammonium salt individually.

The process is particularly effective for treating aqueous systems containing bacterium having a pH of at least 7.2.

DESCRIPTION OF EMBODIMENTS OF THE INVENTION AND BEST MODE

The quaternary ammonium compound used preferably is a mixture of n-alkyl dimethyl benzyl ammonium chloride and n-alkyl dimethyl ethylbenzyl ammonium chloride. It was found that n-alkyl dimethyl benzyl ammonium chloride and n-alkyl dimethyl ethylbenzyl ammonium chloride form compatible mixtures and it is advantageous to use these organic biocides as a mixture in a weight ratio of about 2:1 to 1:2, preferably 1:1. When this mixture is used as the organic biocide, it is preferably used in combination with bis(tributyltin)oxide. The weight ratio of bis(tributyltin)oxide to quaternary ammonium chlorides use is about 1:2 to 1:10, said weight based upon the total weight bis(tributyltin)oxide and quaternary ammonium chlorides.

The amount of quaternary ammonium compound in the biocidal composition is an amount effective in combination with the chlorine dioxide to effectively inhibit the growth of bacteria in the aqueous system. Generally, this is in amount of 1 ppm to 25 ppm, preferably 1.0 ppm to 10.0 ppm, most preferably 1.5 ppm to 3.0 ppm based upon the amount of aqueous system to be treated. Naturally, amounts will vary depending upon the amount of bacteria in the aqueous system to be treated.

Generally, the weight ratio of quaternary ammonium compound to chlorine dioxide will range from 1:5 to 1:100, preferably 1:5 to 1:50, most preferably from 1:5 to 1:25. The biocidal compositions are particularly effective in aqueous systems having a pH of at least 7.2, particularly between 7.7 to 8.7.

EXAMPLES

Controls are designated by letters. They show the amount of contamination in the sample treated, the effectiveness of chlorine dioxide alone and the quaternary ammonium chloride alone. The other examples show the effectiveness of n-alkyl dimethyl benzyl ammonium chloride and n-alkyl dimethyl ethylbenzyl ammonium chloride in conjunction with the chlorine dioxide in the biocidal composition at various concentrations an pH's.

In order to determine the effectiveness of the biocidal compositions for use in a cooling water system, a Relative Population Density Test (R.P.D.) is performed. This test essentially measures the number of bacteria present before and after treatment with the biocidal composition. By using this procedure, the effectiveness of several biocidal compositions at different levels on a single water sample can be examined. The biocidal compositions are evaluated at an alkaline pH of ranging from 7.2 to 8.7.

The actual procedure simulates a cooling tower in that a known volume of cooling water is treated with a known volume of biocidal composition. Treated samples are then agitated on a rotary shaker for a 24-hour contact period. Each sample is then plated out in order to determine which biocidal composition exhibited the greatest percent reduction in bacteria.

The actual procedure is as follows:

1. A known aliquot of an aqueous test sample containing bacteria is measured into each of a number of clean, dry culture flasks (40 ml. is a convenient amount).

2. A specific amount of biocidal composition is added to obtain a known ppm concentration of toxicant in the sample. Normally, cooling water biocides are tested at concentrations of 25 ppm and 50 ppm. A lambda pipette is used to deliver these small quantities. In 40 ml. of sample, 25 ppm is equal to 1 microliter.

$$\frac{25}{1,000,000} = \frac{X}{40}$$

In a 40 ml sample, 50 ppm works out to equal 2 microliter.

3. An aliquot of alkaline water samples contaminated with various bacteria are added to flasks which are dosed with different concentrations of biocides. Untreated control samples and the treated flasks are placed on a rotary shaker and agitated at 37° C. for 24 hours.

4. Each sample is the "plated-out" according to the standard total plate count procedure utilizing tryptone glucose extract agar as the growth medium.

5. After incubation at 37° C. for 48 hours all plates are counted and the results recorded. The percent reduction is computed as follows:

$$\% \text{ reduction} = \frac{A - B}{A} \times 100$$

where A is the average of the two control counts expressed in colonies/ml. and B is the total count of the treated flask expressed in colonies/ml.

The results of testing are shown in Tables I to III which follow. The abbreviations are as follows:

BC=biocide composition
PPM=parts per million of biocide composition based upon the aqueous system treated
BAC/ML=bacteria per milliliter
% RED=percent reduction in bacterium after treatment
QUAT=mixture of bis(tributyltin)oxide as 2.38% active solution in water; 6.25% of active n-alkyl dimethyl benzyl ammonium chloride as a solution in water; and 6.25% of active n-alkyl dimethyl ethylbenzyl ammonium chloride as a solution in water

TABLE I

| | (pH 7.2) | | |
|---|---|---|---|
| TOXICANT | PPM | BACTERIA/ML | REDUCTION |
| Control #1 | | 28,100 | |
| $ClO_2$ | 0.5 | 23,000 | 17.9 |
| | 1.0 | 6,800 | 75.4 |
| QUAT/tin | 0.5 | 6,100 | 78.2 |
| | 1.0 | 1,600 | 94.3 |
| QUAT/tin/$ClO_2$ | 0.5/0.1 | 160 | 99.4 |
| | 0.5/0.5 | 1,200 | 95.7 |
| | 1/0.5 | 1,200 | 95.7 |

Table I shows that when equal levels of quaternary ammonium compound and $ClO_2$ alone are compared with a mixture of these biocides at the same level, the mixture showed more of a biocidal effect than either of the compounds alone.

TABLE II

| | (pH 7.4) | | |
|---|---|---|---|
| TOXICANT | PPM | BACTERIA/ML | REDUCTION |
| Control #1 | | 6,100 | |
| #2 | | 3,400 | |
| $ClO_2$ | 0.5 | 4,600 | 3.2 |
| | 1.0 | 3,400 | 28.4 |
| QUAT/tin | 0.5 | 3,900 | 17.9 |
| | 1.0 | 1,900 | 60.9 |
| QUAT/tin/$ClO_2$ | 0.1/0.5 | <100 | >99.9 |
| | 0.5/0.1 | 7,400 | 70.5 |
| | 0.5/0.5 | 130 | 97.3 |
| | 1/0.5 | <100 | >99.9 |

Table II also shows that when equal levels of quaternary ammonium compound and $ClO_2$ alone are compared with a mixture of these biocides at the same level, the mixture showed more of a biocidal effect than either of the compounds alone.

TABLE III

| | (pH = 7.8) | | |
|---|---|---|---|
| TOXICANT | PPM | BACTERIA/ML | REDUCTION |
| Control #1 | | 880,000 | |
| Control #2 | | 760,000 | |
| $ClO_2$ | 0.10 | 330,000 | 59.8 |
| | 0.25 | 130,000 | 84.1 |
| | 0.60 | 82,000 | 90.0 |
| | 0.75 | 78,000 | 90.5 |
| QUAT/tin | 0.25 | 350,000 | 57.3 |
| | 0.50 | 310,000 | 62.2 |
| | 0.75 | 80,000 | 65.9 |
| QUAT/tin/ $ClO_2$ | 0.5/0.1 | 60,000 | 92.7 |
| | 0.25/0.25 | 32,000 | 96.1 |
| | 0.5/0.25 | 22,000 | 97.3 |

When a level of 0.75 is compared, the results in Table IV show the quaternary ammonium compound and $ClO_2$ alone did not perform as well as the two compounds in combination at the same or lower levels.

TABLE IV

| | (pH 7.9) | | |
|---|---|---|---|
| TOXICANT | PPM | BACTERIA/ML | REDUCTION |
| Control #1 | | 18,000 | |
| #2 | | 14,000 | |
| $ClO_2$ | 0.1 | 11,000 | 90.9 |
| | 0.5 | 4,500 | 95.7 |
| QUAT/tin | 0.5 | 1,000 | 93.7 |
| | 1.0 | 800 | 95.0 |
| QUAT/tin/$ClO_2$ | 0.1/0.5 | 2,100 | 86.8 |
| | 0.5/0.1 | 1,300 | 91.8 |
| | 0.5/0.5 | 220 | 98.6 |
| | 1/0.5 | 160 | 99.0 |

TABLE V (pH 8.7)

| TOXICANT | | PPM | BACTERIA @ ML | REDUCTION |
|---|---|---|---|---|
| Control | #1 | | 8,700,000 | |
| | #2 | | 9,000,000 | |
| $ClO_2$ | | 0.1 | 800,000 | 90.9 |
| | | 0.5 | 380,000 | 95.7 |
| | | 1.0 | 180,000 | 97.9 |
| QUAT/tin | | 0.5 | 3,300,000 | 62.7 |
| | | 1.0 | 520,000 | 94.1 |
| QUAT/tin/$ClO_2$ | | 0.1/0.5 | 5,200 | 99.9 |
| | | 0.5/0.1 | 2,800 | 99.9 |
| | | 0.5/0.5 | 4,100 | 99.9 |
| | | 1/0.5 | 4,000 | 99.9 |

When a level of 1.0 ppm biocide is compared, the results in Table VI show the quaternary ammonium compound and $ClO_2$ alone did not perform as well as the two compounds in combination at the same or lower levels.

We claim:

1. A process for reducing the population of bacteria in a contaminated aqueous system having a pH of at least 7.2 which comprises co-treating said aqueous system with
   A. a quaternary ammonium compound selected from the group consisting of:
      (1) n-alkyl dimethyl benzyl ammonium chloride,
      (2) n-alkyl dimethyl ethylbenzyl ammonium chloride, and mixtures thereof, and
   B. chlorine dioxide,
   wherein the ratio of quaternary ammonium compound to chlorine dioxide is from 1:5 to 1:25.

2. The process of claim 1 wherein the quaternary ammonium compound and chlorine dioxide are sequentially added to said aqueous system without regard to whether the quaternary ammonium compound or the chlorine dioxide is added first.

3. The process of claim 2 wherein the pH of the aqueous system is from 7.7 to 8.7.

4. The process of claim 3 wherein the weight ratio of quaternary ammonium chloride to chlorine dioxide is about 1:1.

5. The process of claim 4 wherein the amount quaternary ammonium chloride and chlorine dioxide added separately to the aqueous system is from 1 ppm to 50 ppm, where said ppm is based upon the total amount of aqueous system to be treated.

6. The process of claim 5 wherein the total amount of quaternary ammonium chloride and chlorine dioxide added separately to the aqueous system is from 1 ppm to 10 ppm, where said ppm is based upon the total amount of aqueous system to be treated.

* * * * *